(12) United States Patent
Maria Ruiter

(10) Patent No.: US 8,024,891 B2
(45) Date of Patent: Sep. 27, 2011

(54) STRIP ASSEMBLY

(76) Inventor: Jacobus Christiaan Gerardus Maria Ruiter, Zoetermeer (NL)

( * ) Notice: Subject to any disclaimer, the term of this patent is extended or adjusted under 35 U.S.C. 154(b) by 239 days.

(21) Appl. No.: 12/444,528

(22) PCT Filed: Oct. 4, 2007

(86) PCT No.: PCT/NL2007/050481
§ 371 (c)(1),
(2), (4) Date: May 19, 2009

(87) PCT Pub. No.: WO2008/041848
PCT Pub. Date: Apr. 10, 2008

(65) Prior Publication Data
US 2010/0050544 A1    Mar. 4, 2010

(30) Foreign Application Priority Data
Oct. 4, 2006    (NL) ..................................... 2000258

(51) Int. Cl.
*A01G 9/00*    (2006.01)
(52) U.S. Cl. ............................................................ 47/17
(58) Field of Classification Search ....... 47/17; 174/384
See application file for complete search history.

(56) References Cited

U.S. PATENT DOCUMENTS

| | | | | |
|---|---|---|---|---|
| 2,857,634 A | * | 10/1958 | Garbade et al. | 49/77.1 |
| 3,249,682 A | * | 5/1966 | Nikolaus | 174/384 |
| 3,384,147 A | * | 5/1968 | Smith | 160/107 |
| 4,095,369 A | * | 6/1978 | Posnansky et al. | 47/22.1 |
| 4,462,452 A | | 7/1984 | Oskam | |
| 5,014,481 A | * | 5/1991 | Moe | 52/406.3 |
| 5,850,861 A | | 12/1998 | Silverberg | |
| 2010/0050544 A1 | * | 3/2010 | Ruiter | 52/173.3 |

FOREIGN PATENT DOCUMENTS

| | | |
|---|---|---|
| DE | 44 42 870 | 3/1996 |
| EP | 0 070 093 | 1/1983 |
| FR | 2 577 607 | 8/1986 |
| JP | 6-229177 | 8/1994 |

* cited by examiner

*Primary Examiner* — Frank T Palo
(74) *Attorney, Agent, or Firm* — Young & Thompson

(57) ABSTRACT

Strip assembly consisting of a number of strips hingeably attached to influence or not to influence light. Strips can be displaced between two positions by static charging/discharging with respect to a support attached near the strip. A voltage source provides the strips/further electrodes with the respective voltage. The strips can be configured to be (partially) non-transparent, allowing light effects to be obtained. In addition, it is possible to configure various strips differently. The strips preferably consist of a foil material allowing an especially simple construction with the aid of a film hinge. Suitable materials include polycarbonate, polyester or plastics material based on aromatics. The surface resistance is preferably at most 1000 MΩ. A broad range of uses are possible. One use is that in greenhouses but the present invention can also be applied at other locations where protection from light is necessary or specific light effects are desired.

15 Claims, 3 Drawing Sheets

STRIP ASSEMBLY

STATEMENT REGARDING FEDERALLY SPONSORED RESEARCH OR DEVELOPMENT

None

THE NAMES OF THE PARTIES TO A JOINT RESEARCH AGREEMENT

None

INCORPORATION-BY-REFERENCE OF MATERIAL SUBMITTED ON A COMPACT DISC

None

BACKGROUND OF THE INVENTION (1) Field of the Invention

The present invention relates to a strip assembly comprising a carrier provided with a number of tiltable strips.

(2) Description of Related Art Including Information Disclose

A strip assembly of this type is generally known in the art. In greenhouses, in particular, ever more stringent requirements are being placed on screening. This concerns the prevention of both undesirable irradiation of sunlight and undesirable emission of growth light. Strips or slats are one possibility for regulating the desired amount of passing light. Known in the art are mechanical constructions which, owing to their complexity, have never been used on a large scale. A further known construction consists of the use of magnets, as a result of which the tilting movement of the strips is generated by magnetic action. Therein coils are in some way made electrically magnetic and this can (temporarily) during use on large surface areas such as greenhouses require substantial current intensity, necessitating the laying of cables of considerable thickness. In addition, the operational safety of constructions of this type is limited.

The object of the present invention is to provide a strip assembly which does not have the drawbacks of the prior art, is simple to install and highly regulable and requires few additional measures in a building construction.

BRIEF SUMMARY OF THE INVENTION

In an above-described strip assembly, this object is achieved with the features of claim 1.

According to the present invention, displacement of the strips is controlled electrostatically. Providing the strips or a portion thereof with a polarity and providing the further electrodes with the same or, conversely, a different polarity will cause the strips of the further electrodes to move away from or toward said strips respectively. In addition, the various elements can operate in combination with gravity, i.e. the strips return of their own accord to a specific rest position as a result of a potential difference no longer being present.

With the current technologies, it is relatively simple to generate high potential differences without complex constructions being necessary for this purpose. That is to say, a simple low-voltage activator allows, a simple power source which may or may not be present on site, a high potential difference to be generated, as a result of which the strips can move into a different position. Power consumption is very limited, so the intended displacement can be carried out using very little energy.

This high voltage can be transmitted via conduction but in a particular embodiment of the present invention it is possible to dispense with electrical connections between, for example, two remote foil layers between which the strips are attached. In such a case, power can be transmitted wirelessly with induction. This induction can comprise both the low-voltage part and the high-voltage part. In addition, it is possible, if two remote (foil) layers or other plates are used, to attach the supply in the edge zone separating these foil layers/plates. Apart from conventional technologies and the above-described induction-based transfer of energy, ceramic or magnetic systems can also be used to generate short-term voltage peaks.

The strips can comprise any material known in the art. Examples include foil material or rigid material. In the case of rigid material, a hinge has to be attached to allow the strip to be displaced. In the case of foil material, a film hinge made of the foil material can be used. Examples of materials which can be used include polycarbonate, polyester or types of foil based on aromatics.

The strip can be configured as a function of the desired change in the through-light. It may thus be desired to remove, absorb or reflect merely a specific portion of the light spectrum or, conversely, to allow through just a specific portion. The strip may be coloured accordingly or be provided with a corresponding coating. It is also possible that complete reflection is aimed for in a specific direction. In this case, the strips are either metallic (aluminium) or provided with a metallic reflective coating. It is also possible to influence the path of the light by reflection, by positioning the strips. If a series of strips is used in a surface, it is possible to displace one or more of said strips, allowing a specific effect to be obtained. It is thus possible to provide gradual darkening or illumination.

Each strip or slat can comprise a single part. However, it is also possible for each strip to consist of a number of foil parts attached so as to overlap. Overlapping arrangement can counteract effects of temperature changes resulting in shrinkage and expansion. The strips may, for example, be approximately 2 cm wide. The strips may, in principle, be long, a length of tens of centimeters to tens of meters being preferred.

The strips can be used not only in greenhouses but also in other applications. In many locations there are problems with incident light and, in particular, solar radiation which is undesirable at specific moments. In addition, in shopping centres or the like, the strips can be used to obtain colouring effects by configuring the strips in various ways or by positioning merely specific groups of strips in the light path and leaving other groups out. A person skilled in the art will be able to think of numerous variations.

In all cases, it is advantageous to integrate the assembly between two externally attached plates or the like. These may be two parallel plates between which the strip assembly is positioned but it is also possible to use what is known as a cushion foil and to attach the strip assembly according to the invention in the cushion. Obviously, other constructions are also possible. Attachment between two protective layers largely prevents the infiltration of dirt and moisture and ensures operation of the strip assembly even over a relatively longer period of time.

The further electrodes can contain any construction conceivable in the art. According to a particular embodiment, the further electrodes are configured as wires (grid). This has the advantage of not impeding or scarcely impeding the passage of light. In addition, this has the advantage that the thickness of these wires allows them to act as spacers with respect to a surface, thus preventing the strips from sticking.

When used in greenhouses, the strip assembly is preferably used in the roof construction, the panels attached therein consisting of plates which are set apart parallel to one another and between which the strips are attached. The panels are preferably oriented in such a way that at the moment at which they have to be most effective (closing off) they are positioned substantially perpendicularly to the direction of the incident solar radiation.

Apart from folding or tilting between two positions, an opened and closed position, it is possible in a particular embodiment of the invention to provide a number of intermediate positions between completely open and completely closed, thus allowing the incident light to be regulated, for example.

BRIEF DESCRIPTION OF THE SEVERAL VIEWS OF THE DRAWINGS

The invention will be described in greater detail hereinafter with reference to the illustrative embodiments shown in the drawings, in which.

DETAILED DESCRIPTION OF THE INVENTION

Figure 1:
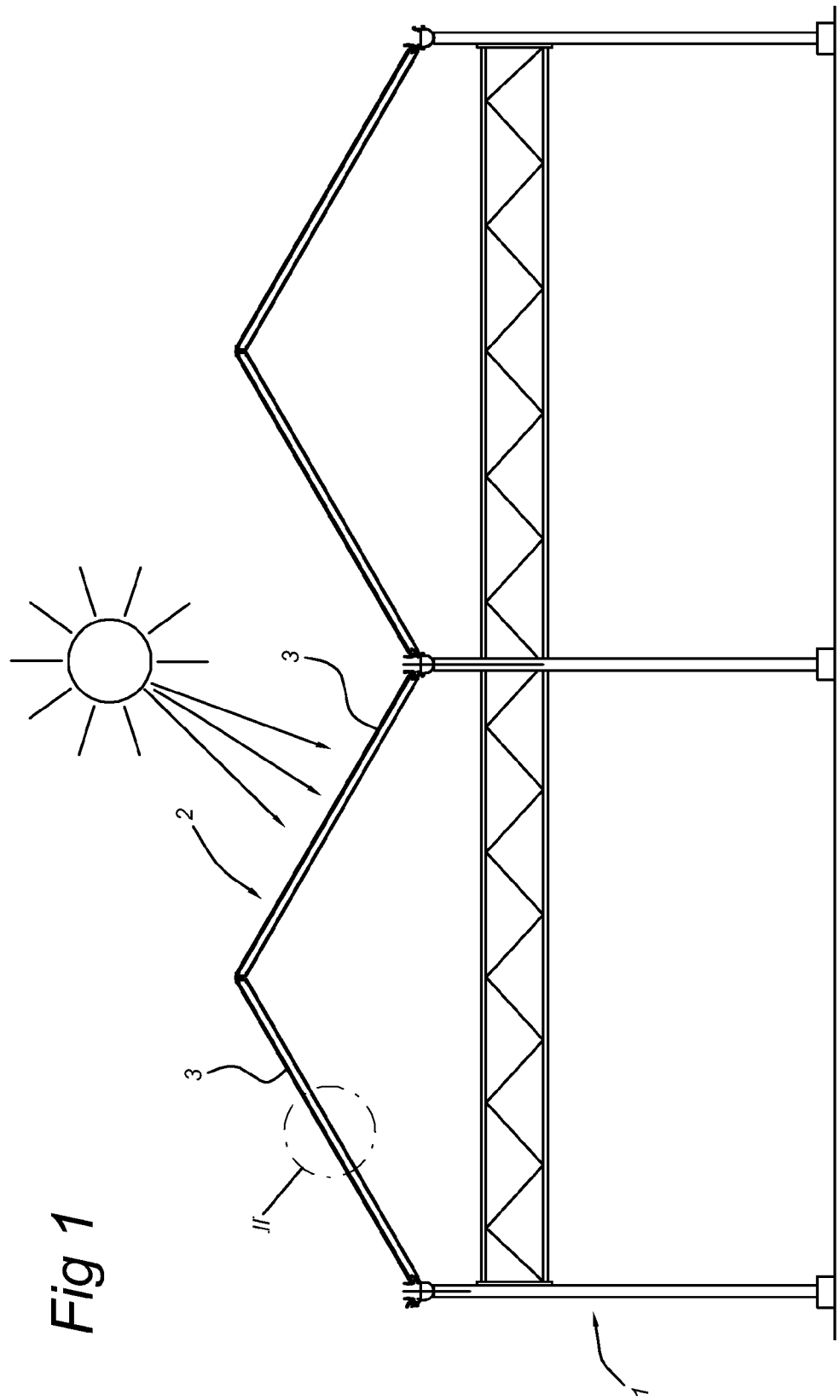
FIG. 1 shows a greenhouse provided with the strip assembly according to the invention.

In FIG. 1, reference numeral 1 denotes a greenhouse. The greenhouse consists of a number of roof sections 2 and each roof sections is constructed from panels 3. The panels 3 are preferably oriented such that the angle which the panels form with respect to incident solar radiation at the moment at which the protection has to be most effective is approximately 90 degrees.

Figure 2:
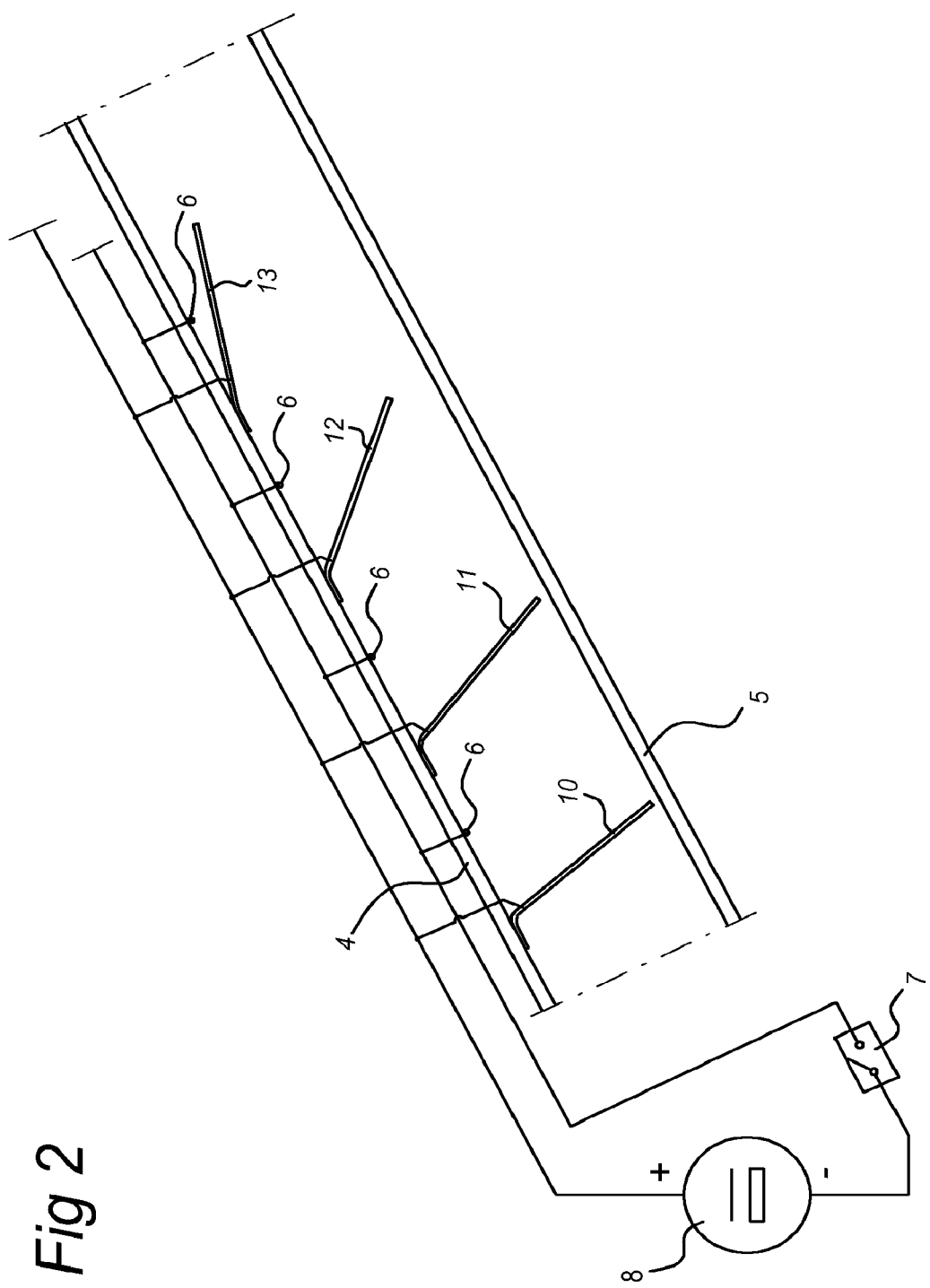
FIG. 2 shows detail II from FIG. 1.

FIG. 2 shows a detail of the panel 3. The panel consists of two remote translucent plates 4 and 5. The plates may be glass plates but also plastics materials plates and the like. The strip or slat assembly according to the invention is attached between these plates. The strip assembly consists of a number of translucent further electrodes 6 and strips or electrodes 10-13. In FIG. 2, the strips 10-13 are shown in all cases in a different position for the sake of clarity. The further electrodes 6 are configured as grid and connected to the first pole of a schematically illustrated voltage source, whereas the strips 10-13 are connected to the other pole of a voltage source via the line 8 and switch 7. The voltage source may be located close to the panel and be any construction known in the art with which high voltage can be generated. The voltage source can be operated remotely, i.e. the switch 7 can be a remotely operated switch.

The particular embodiment of the strips allows the strips to be electrostatically drawn toward the further electrodes or driven away therefrom respectively. The movement will also be influenced by gravity. In the presence of a potential difference as shown in FIG. 2, the strips will move toward the further electrodes 6. With the same polarity on the strips 10-13 and further electrodes 6, repulsion will take place. However, it is also possible to give the strips a shape memory, as a result of which the strips move, when no voltage is applied, in a specific direction, preferably in the direction for the complete passage of light (perpendicular direction). This position can also be obtained by gravity.

If use is made of, for example, plastics materials plates, it is possible to allow the strips and plates to be assembled by common extrusion. Therein the plastics material used is, in particular, polycarbonate. During extrusion of the plate material, there are at the same time introduced the strips which have already been (partially) produced and are in this way clamped in the extruded plastics material. It is also possible to use other types of plastics material which may or may not be conductive. A combination of plastics materials for the plates is also conceivable for obtaining specific optical properties. In addition, coatings can be attached for influencing the light, absorbing, reflecting or displacing of spectra or the conversion of, for example, ultraviolet light to visible light.

Figure 3:
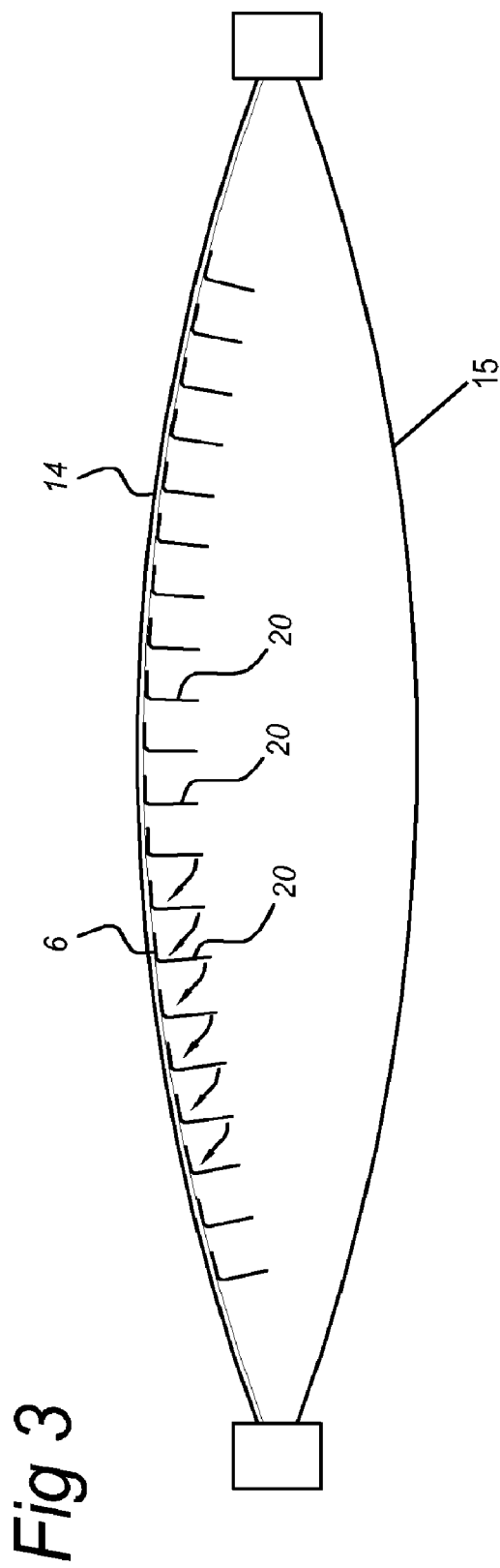
FIG. 3 shows an altered embodiment of the construction according to FIG. 2.

FIG. 3 shows a variation of the invention used in what is known as a foil cushion. The foil cushion consists of two foil layers 14, 15 which are held apart from each other by compressed air or another gas. A cushion of this type can be used as a roof of greenhouses or other spaces. A construction of this type is especially simple to produce. Reference numeral 20 denotes the strips and reference numeral 6 the further electrodes and in this case the folding or tilting effect can be obtained in the same way. This further electrode is configured as a coating attached to the foil layer 14 which is substantially translucent.

Figure 4:
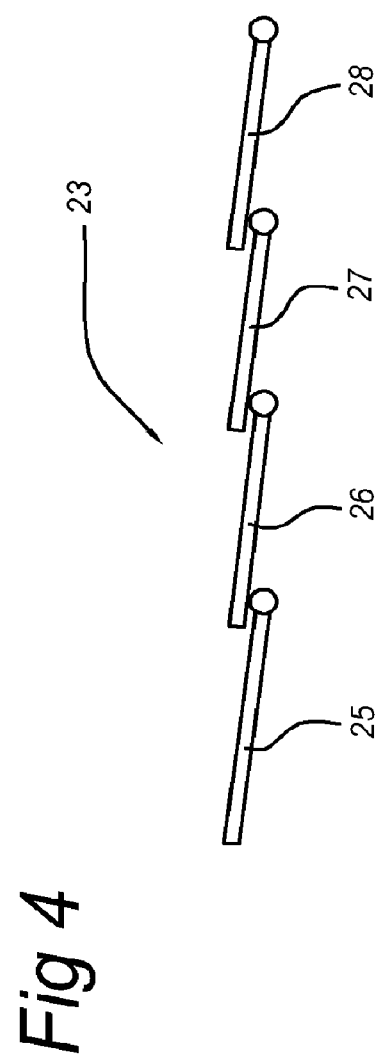
FIG. 4 shows a strip constructed from overlapping strip parts.

FIG. 4 shows a strip 23 constructed from strip parts 25-28 which overlap one another in the closed position. The overlapping is in this case such as to not impede operation of the separate electrodes/strips.

Changes in the dimensions have no effect whatsoever on the operation of the strip assembly. The electrode and further electrodes respectively can be made from any conceivable material. Examples include a metallic layer, a layer of non-conductive material to which a conductive additive is added, a conductive coating or an intrinsically conductive layer. Electrets are a further possibility for producing the electrode and further electrodes respectively.

Depending on the use, it is possible to make the strips from any desired material in any desired state. Foil material is preferred because it is in this case not necessary to provide a separate hinge construction. The strips may or may not be translucent or filter merely specific portions of the light spectrum. This can be achieved by the presence of coatings and the presence or non-presence of the metal layer.

Obviously, it is possible to attach the strips in groups. That is to say, one group of strips is activated separately in relation to a further group of strips. These groups can be dispersed from one another, i.e. strips can, in turns, be controlled using different controllers. It is thus, for example, possible to simulate a dawning effect or to obtain various colouring effects.

After the above, a person skilled in the art will immediately think of variations which are within the scope of the appended claims.

The invention claimed is:

1. A strip assembly comprising a carrier provided with a number of foldable strips, wherein said strips comprising electrodes, in that said assembly with said electrodes comprises cooperating further electrodes, each electrode consisting of a statically chargeable/dischargeable material and said electrodes comprising electrical voltage connections.

2. The strip assembly according to claim 1, comprising a voltage source connected to said voltage connections, wherein the connection of said strips has a different voltage/polarity to that of said further electrodes.

3. The strip assembly according to claim 1, wherein said strip comprises a foil with a film hinge with said support.

4. The strip assembly according to claim 3, wherein said foil is provided with a coating.

5. The strip assembly according to claim 3, wherein said foil comprises a polycarbonate, polyester foil or foil based on aromatics.

6. The strip assembly according to claim 1, wherein said foil comprises a metal foil.

7. The strip assembly according to claim 3, wherein said foil comprises a surface resistance of at most 1000 MΩ.

8. The strip assembly according to claim 1, wherein said strips are configured differently from one another.

9. The strip assembly according to claim 1, wherein a strip comprises a number of foil parts attached so as to overlap.

10. The strip assembly according to claim 1, wherein the width of said strips is approximately 2 cm.

11. The strip assembly according to claim 1, attached between two optically permeable layers.

12. The strip assembly according to claim 11, wherein said layers comprise transparent plastics material or glass layers.

13. The strip assembly according to claim 1, wherein said strip and/or further electrodes are electrostatically charged by electrets.

14. A greenhouse comprising a top construction with top panels, comprising electrodes, in that said assembly with said electrodes comprises cooperating further electrodes, each electrode consisting of a statically chargeable/dischargeable material and said electrodes comprising electrical voltage connections wherein said strip assembly is attached in said panels.

15. The greenhouse according to claim 14, wherein the angle of said panels with respect to the horizontal is such that, during the most intensive solar irradiation, the panels are positioned substantially perpendicularly to the direction of irradiation.

* * * * *